(12) United States Patent
Matsumoto et al.

(10) Patent No.: US 8,181,932 B2
(45) Date of Patent: May 22, 2012

(54) NORMALLY OPEN TYPE PIEZOELECTRIC ELEMENT DRIVEN METAL DIAPHRAGM CONTROL VALVE

(75) Inventors: Atsushi Matsumoto, Osaka (JP); Kaoru Hirata, Osaka (JP); Ryousuke Dohi, Osaka (JP); Nobukazu Ikeda, Osaka (JP); Kouji Nishino, Osaka (JP)

(73) Assignee: Fujikin Incorporated, Osaka (JP)

( * ) Notice: Subject to any disclaimer, the term of this patent is extended or adjusted under 35 U.S.C. 154(b) by 293 days.

(21) Appl. No.: 12/161,549

(22) PCT Filed: Nov. 13, 2006

(86) PCT No.: PCT/JP2006/323050
§ 371 (c)(1),
(2), (4) Date: Aug. 11, 2010

(87) PCT Pub. No.: WO2007/083439
PCT Pub. Date: Jul. 26, 2007

(65) Prior Publication Data
US 2010/0294964 A1    Nov. 25, 2010

(30) Foreign Application Priority Data
Jan. 18, 2006    (JP) .................................. 2006-009625

(51) Int. Cl.
*F16K 31/02* (2006.01)
(52) U.S. Cl. .............. 251/129.06; 251/61.4; 251/129.02
(58) Field of Classification Search ................. 251/61.1, 251/61.2, 61.4, 129.02, 129.06
See application file for complete search history.

(56) References Cited

U.S. PATENT DOCUMENTS

| 5,092,360 | A | * | 3/1992 | Watanabe et al. | 137/487.5 |
| 5,094,430 | A | * | 3/1992 | Shirai et al. | 251/129.06 |
| 5,100,100 | A | * | 3/1992 | Benson et al. | 251/129.06 |
| 5,145,147 | A | * | 9/1992 | Nakazawa et al. | 251/129.06 |
| 6,152,168 | A | * | 11/2000 | Ohmi et al. | 137/487.5 |

(Continued)

FOREIGN PATENT DOCUMENTS
JP    56-105177    8/1981
(Continued)

OTHER PUBLICATIONS
International Search Report, issued in corresponding application No. PCT/JP2006/323050, completed Dec. 4, 2006, mailed Dec. 12, 2006.

*Primary Examiner* — John Fristoe, Jr.
*Assistant Examiner* — Marina Tietjen
(74) *Attorney, Agent, or Firm* — Griffin & Szipl, P.C.

(57) ABSTRACT

A control valve has a body that forms a valve chamber and a valve seat, a metal diaphragm installed inside the valve chamber and making contact with and departing from the valve seat, an actuator box fixed to the side of the body, a piezoelectric element installed inside the actuator box to thrust the metal diaphragm through mediation of a metal diaphragm presser by elongating downward when voltage is applied, a conical spring mechanism that absorbs elongation of the piezoelectric element at the time when the metal diaphragm makes contact with the valve seat and a prescribed thrust is applied to the valve seat and the like, and a preload mechanism that applies upward compressive force to the piezoelectric element all the time wherein the compressive force applied to the piezoelectric element is externally adjustable.

5 Claims, 5 Drawing Sheets

U.S. PATENT DOCUMENTS

| | | | |
|---|---|---|---|
| 6,178,995 B1 * | 1/2001 | Ohmi et al. | 137/486 |
| 6,345,803 B2 * | 2/2002 | Sakurai | 251/129.06 |
| 6,394,415 B1 * | 5/2002 | Ohmi et al. | 251/129.16 |
| 6,520,479 B1 * | 2/2003 | Sato | 251/129.06 |
| 7,654,137 B2 * | 2/2010 | Hirata et al. | 73/204.18 |
| 2004/0041111 A1 * | 3/2004 | Boecking | 251/129.06 |
| 2010/0012026 A1 * | 1/2010 | Hirata et al. | 118/666 |
| 2010/0127196 A1 * | 5/2010 | Sawada et al. | 251/129.06 |

FOREIGN PATENT DOCUMENTS

| | | |
|---|---|---|
| JP | 02-203087 | 8/1990 |
| JP | 07-310842 | 11/1995 |
| JP | 10-275018 | 10/1998 |
| JP | 2003-120832 | 4/2003 |
| JP | 2004-197754 | 7/2004 |
| JP | 2005-149075 | 6/2005 |

* cited by examiner

Temperature Characteristics of Displacement Length (1) A control valve provided with a preload mechanism
(2) A control valve not provided with a preload mechanism

NORMALLY OPEN TYPE PIEZOELECTRIC ELEMENT DRIVEN METAL DIAPHRAGM CONTROL VALVE

This is a National Phase Application in the United States of International Patent Application No. PCT/JP2006/323050 filed Nov. 13, 2006, which claims priority on Japanese Patent Application No. 2006-009625, filed Jan. 18, 2006. The entire disclosures of the above patent applications are hereby incorporated by reference.

FIELD OF THE INVENTION

The present invention relates to improvements in a normally open type piezoelectric element driven metal diaphragm control valve to be used mainly as a control valve for a pressure type flow rate control apparatus or as a control valve for a flow rate control part of a mass flow controller that is provided with a gas control line for semiconductor manufacturing facilities, and the like. More particularly, the present invention is concerned with a normally open type piezoelectric element driven metal diaphragm valve with which accurate and stable flow rate control can be achieved even under high temperature conditions in which high temperature reaction gases, and the like, are used.

TECHNICAL BACKGROUND OF THE INVENTION

In recent years, with respect to semiconductor manufacturing facilities, chemical products manufacturing facilities, and the like, pressure type flow rate control apparatuses have been widely utilized to replace mass flow rate controllers. With respect to the pressure type flow rate control apparatuses, a so-called "metal diaphragm control valve" has been employed with increasing frequency due to its many advantages, such as high corrosion resistance, a low dust producing nature, excellent gas displacement property, fast open/close velocity, and the like. Also, piezoelectric element driven actuators having the characteristics of great driving force, excellent responsivity and control characteristics have been widely used as the actuator for pressure type flow rate control apparatuses.

Conventionally known metal diaphragm control valves employing a piezoelectric element driven actuator include ones provided with the structure disclosed in Japanese Unexamined Patent Application No. 7-310842 (Patent Document 1) and Japanese Unexamined Patent Application No. 2004-197754 (Patent Document 2), and the like.

More specifically, a control valve (not illustrated) as disclosed in Patent Document 1 is a normally open type control valve wherein a metal diaphragm is thrust to the valve seat side through mediation of an under-side rest, a ball and a diaphragm presser. The diaphragm presser is a piezoelectric element that is elongated with the application of voltage, thus making the metal diaphragm touch a valve seat so as to be in a state of closing, and the length of the elongated piezoelectric element then returns to its original length when voltage applied to the metal diaphragm is switched off thereby causing the thrust applied to the metal diaphragm to clear off. In this way, the metal diaphragm gets back to its original state with the aid of its elastic force; thus, the normally open type control valve returns to a state of being open because the metal diaphragm departs from the valve seat.

With respect to the control valve, the generating force of the piezoelectric element is transmitted to the metal diaphragm through the mediation of the under-side rest, the ball and the diaphragm presser. In this way, the generating force of the piezoelectric element is made to be applied directly to the seat part (comprising a valve seat and a portion contacting with the seat of a metal diaphragm) due to elongation of the piezoelectric element once the diaphragm touches the valve seat. As a result, the force applied to the seat part of the control valve depends only on the generating force of the piezoelectric element. This configuration makes adjustment difficult, and also causes disadvantages in that the metal diaphragm, the valve seat, and the like, might be damaged because a large generating force generated by the piezoelectric element is applied to the seat part.

On the other hand, a control valve (not illustrated) such as is disclosed in Patent Document 2 is a normally open type control valve with which the displacement length of a piezoelectric element is lengthened by means of a displacement lengthening mechanism having a lever structure. This piezoelectric element (a piezo actuator) employed by the control valve becomes elongated with the application of voltage, which places the control valve in the state of being closed (i.e., closed state) as the metal diaphragm of the control valve is thrust and contacts with a valve seat side through mediation of a valve shaft and a diaphragm presser. On the other hand, once the piezoelectric element is in a state of elongation (i.e., the closed state), it returns to its original length, and the displacement lengthening mechanism thus returns to its original state by means of a return elastic body provided thereon. In this way, the thrust force applied to the metal diaphragm is cleared off (i.e., ceases) and the metal diaphragm returns to its original state with the aid of an elastic force provided by the return elastic body so that the control valve moves to the state of being open (i.e., the open state) by means of the diaphragm departing from the valve seat.

The control valve, therefore, is equipped with a constant pressure elastic body (a shock absorbing conical spring) that absorbs elongation of the piezoelectric element when the displacement lengthening mechanism transmits the generating force provided by the piezoelectric element to the metal diaphragm. Then, once the metal diaphragm makes contact with the valve seat, the elastic body, which exerts a constant pressure, absorbs elongation of the piezoelectric element. In this way, a repulsion force is applied to the seat part in a manner corresponding to the force of the displacement length of the constant pressure elastic body. As a result, the force applied to the seat part of the control valve becomes the repulsion force of the constant pressure elastic body, which allows the metal diaphragm to make contact with the valve seat while absorbing shock. This prevents the metal diaphragm and the valve seat from being damaged without the piezoelectric element having to exert a large generating force to the metal diaphragm and the valve seat.

Now, with respect to a control valve that is not provided with a shock absorbing conical spring, for example, the following observation is made. In the case when a displacement length per 1V of applied voltage of the piezoelectric element is 0.333 μm and the generating force per 1V of applied voltage of the piezoelectric element is approximately 5N, then the ratio of generating force to displacement length of the piezoelectric element becomes 5/0.333≈15 N/μm. On the other hand, in the case when the control valve is provided with a shock absorbing conical spring, the ratio of generating force to displacement length of the conical spring becomes approximately 0.267 N/μm because of the spring rate of the conical spring. Accordingly, the force applied to the seat part of the control valve provided with a shock absorbing conical spring results in approximately 1/56th the force applied to the seat part of the control valve not provided with a shock absorbing conical spring. As a result of this difference, damage to the metal diaphragm and to the valve seat can be prevented by using a control valve provided with a conical spring.

FIG. 6 is a graphic plot of the relationship between the load to a seat part of a control valve and the voltage applied to the piezoelectric element. As is apparent from the graph shown in FIG. 6, it is learned that the load exerted to the seat part is very light for a control valve provided with a conical spring in comparison with a control valve that is not provided with a conical spring.

However, even with a control valve provided with a conical spring, there remain some disadvantages which need to be solved. Specifically, in the case wherein the control valve is used under high temperature conditions, such as 100° C. or higher, it is observed that due to thermal expansion of the supporting cylinder-shaped actuator box there is formed a clearance space between the upper end part of the piezoelectric element and an adjustment cap nut screw-fixed to the upper end part of the supporting cylindrical body of the control valve. This clearance space makes it difficult for the generating force to be transmitted surely and smoothly to the metal diaphragm at the time when the piezoelectric element is elongated, thus making accurate flow rate control impossible or difficult to achieve. It should be especially noted that a control valve's flow rate characteristics are immensely affected by even small thermal expansion of members (e.g., the supporting cylindrical body, and the like) that are components of the control valve because the displacement length of the piezoelectric element is very small.

To solve such a problem as stated above (that is, wherein a clearance has occurred due to the thermal expansion of the supporting cylindrical body), it is preferred that the control valve is structured so that a compressive force of 200N or so can be applied to the piezoelectric element from the outside (i.e., externally). However, such a control valve has not yet been developed to this date.

In accordance with a control valve disclosed in Japanese Unexamined Patent Application Publication No. 2004-197754 (Patent Document 2) and a control valve disclosed in Japanese Unexamined Patent Application Publication No. 2-203087 (Patent Document 3), a returning elastic body and a load spring have been disclosed. However, it is noted that the returning elastic body and the load spring employed by these control valves are both for returning members (i.e., a displacement lengthening mechanism and a valve shaft) to the original position. Also, the returning elastic body and the load spring are both installed inside the control valve. Therefore, in the event that a returning elastic body and a load spring having a large elastic force are employed, it becomes inevitable that the control valve needs to be upsized. Also, another disadvantage with a control valve provided with a returning elastic body and a load spring inside the valve is that it is required that the control valve needs to be dismantled in order to replace the returning elastic body or the load spring, which are stored inside the control valve with another replacement returning elastic body or load spring, or to adjust the elasticity of the returning elastic body or load spring. Assembling and disassembling of the control valve are very time-consuming.

[Patent Document 1] Japanese Unexamined Patent Application No. 7-310842.

[Patent Document 2] Japanese Unexamined Patent Application No. 2004-197754.

[Patent Document 3] Japanese Unexamined Patent Application No. 2-203087.

OBJECTS OF THE INVENTION

In view of the foregoing disadvantages, it is an object of the present invention to provide a normally open type piezoelectric element driven metal diaphragm control valve, which even under high temperature conditions, makes it possible to achieve accurate, stable flow rate control, and is constructed so that the compressive force applied to the piezoelectric element can be simply and easily adjusted without having to dismantle the control valve.

SUMMARY OF THE INVENTION

In order to achieve the aforementioned object of the present invention, the present invention, in accordance with a first embodiment, is characterized by comprising: a body with a valve seat on the bottom face of a valve chamber having an open upper end, a metal diaphragm installed in an opposite direction to the valve seat in a state so that an outer periphery of the metal diaphragm is hermetically sealed in the valve chamber, and is making contact with the valve seat due to downward thrust, and that departs from the valve seat due to an elastic force when the downward thrust is cleared off, a diaphragm presser installed on an upper face side of the metal diaphragm, an actuator box installed above the valve chamber, and a lower end part of the actuator box is fixed to a body side of the valve chamber, a piezoelectric element installed inside the actuator box, wherein thrusting of the metal diaphragm is performed through mediation of the diaphragm presser, wherein the diaphragm presser elongates downward due to application of voltage, a conical spring mechanism disposed between the diaphragm presser and the piezoelectric element, wherein the conical spring mechanism is disposed to absorb elongation of the piezoelectric element when the metal diaphragm makes contact with the valve seat, and the conical spring mechanism applies a prescribed thrust to a seat part comprising the valve seat and a part of the metal diaphragm making contact with the valve seat, and a preload mechanism installed between the piezoelectric element and around the actuator box, wherein the preload mechanism constantly applies an upward compressive force to the piezoelectric element, wherein the compressive force applied to the piezoelectric element by the preload mechanism is adjustable externally.

The present invention, in accordance with a second embodiment, further modifies the first embodiment so that the preload mechanism comprises: a disc-shaped No. 1 preload jig installed directly under the piezoelectric element, wherein the disc-shaped No. 1 preload jig makes contact with a lower end face of the piezoelectric element through mediation of a ball, a cylinder-shaped No. 2 preload jig fitted to an outer peripheral face of the actuator box so as to be capable of free, vertical movements, a coupling pin inserted in the No. 1 preload jig and in the No. 2 preload jig so as to connect the No. 1 preload jig with the No. 2 preload jig, wherein the coupling pin travels with free vertical movements along a longitudinal guide hole formed on the actuator box, a preload adjustment nut that screws to provide free vertical movement along an outer peripheral face of an upper end part of the No. 2 preload jig, and a preload spring installed around the actuator box in a state so that an upper end part of the preload spring makes contact with the preload adjustment nut that constantly presses the piezoelectric element by pushing up the No. 1 preload jig, the coupling pin, the No. 2 preload jig and the preload adjustment nut so that the compressive force applied to the piezoelectric element is adjustable by adjusting a clamping degree of the preload adjustment nut.

Furthermore, the present invention, in accordance with a third embodiment, further modifies the first and second embodiments so the conical spring mechanism comprises: a diaphragm presser holder having a lower end part that is fitted with the diaphragm presser and a housing space formed with an open top on an upper end part of the diaphragm presser holder, a plurality of conical springs placed in the housing space of the diaphragm presser holder, a ball rest for a ball placed on an upper face of an uppermost conical spring, wherein the ball rest makes contact with the No. 1 preload jig of the preload mechanism at a center part of an upper face, and a spring adjustment nut is screwed to an outer peripheral face of the upper end part of the diaphragm presser holder so as to be movable with free vertical movements to adjust a repulsion force of the uppermost conical spring and to prevent the ball rest and the plurality of conical springs from coming off, wherein the repulsion force of the conical spring is adjusted by adjusting a clamping degree of the spring adjustment nut.

Effects of the Invention

A normally open type piezoelectric driven metal diaphragm control valve of the present invention exhibits excellent effects as follows:

(1) A normally open type piezoelectric driven metal diaphragm control valve in accordance with the present invention is equipped with a preload mechanism, which applies an upward compressive force constantly to the piezoelectric element so as to make it possible that the certain compressive force is constantly applied to the piezoelectric element through mediation of preload even when the actuator box, which accommodates the piezoelectric element, is in an expanded state due to thermal expansion, for example, which may occur when the control valve is in use under high temperature conditions. As a result, accurate flow rate control can be achieved by the piezoelectric element driven metal diaphragm control valve of the present invention because the generating force is transmitted surely and smoothly to the metal diaphragm at the time when the piezoelectric element is elongated.

(2) The piezoelectric element driven metal diaphragm control valve, in accordance with the present invention, has its piezoelectric element compressed upwardly all the time by the preload mechanism and, therefore, can remove the force of weight of the piezoelectric element exerted to the metal diaphragm. This feature makes the weight or force applied to the metal diaphragm lighter, and also reduces the load to be applied to the metal diaphragm at the time when the metal diaphragm departs from the valve seat due to the elasticity of the metal diaphragm, thus preventing deterioration of the metal diaphragm and improves the life of the metal diaphragm.

(3) A piezoelectric element driven metal diaphragm control valve, in accordance with the present invention, has a preload spring of a preload mechanism that presses the piezoelectric element at all times, wherein the preload spring is provided around the actuator box, and the compressive force applied to the piezoelectric element of the piezoelectric element driven metal diaphragm control valve can be adjusted by means of a preload adjustment nut screwed to a No. 2 preload jig positioned outside the actuator box. This feature of the invention does not require that the actuator box, and the like, be upsized even when the preload spring is selected to have large elasticity. Furthermore, the strength of the compressive force applied to the piezoelectric element can be freely adjusted by means of the preload adjustment nut without having to disassemble the control valve.

(4) A piezoelectric element driven metal diaphragm control valve of the present invention is provided with a No. 2 preload jig of the preload mechanism, a preload adjustment nut and a preload spring disposed around the actuator box. This feature of the invention thus allows assembly of the piezoelectric element driven metal diaphragm control valve to be achieved relatively simply and easily.

(5) A piezoelectric element driven metal diaphragm control valve, in accordance with the present invention, is provided with a diaphragm presser installed on an upper face side of the metal diaphragm and a piezoelectric element provided with a conical spring mechanism that allows the elongation of the piezoelectric element to be absorbed at the time when the metal diaphragm makes contact with the valve seat, and so that a prescribed amount of thrust is applied to the valve seat and to the part or portion (i.e., a seat part) of the metal diaphragm making contact with the valve. Thus, the conical spring mechanism absorbs elongation of the piezoelectric element once the metal diaphragm makes contact with the valve seat thereby preventing the metal diaphragm and the valve seat from being damaged due to a large generating force generated by the piezoelectric element because the conical spring mechanism ensures that such a force is not being directly applied to the seat part.

(6) A piezoelectric element driven metal diaphragm control valve, in accordance with the present invention, is constructed so that a conical spring mechanism comprises: a diaphragm presser holder that forms a housing space having an open upper part, a plurality of conical springs placed in the housing space of the diaphragm presser holder, a ball rest placed on an upper face of the uppermost conical spring, and a spring adjustment nut screwed to the diaphragm presser holder so as to be capable of free vertical movement in order to adjust the strength of repulsion of the uppermost conical spring and so as to prevent the ball rest and the uppermost conical spring from coming off the diaphragm presser holder, wherein the strength of the repulsion force of the uppermost conical spring can be adjusted by adjusting a clamping degree of the spring adjustment nut. With this structure, the repulsion of the uppermost conical spring is able to be freely adjusted without having to replace the uppermost conical spring with another one having the desired repulsion strength.

REFERENCE NUMERALS

Figure 1:
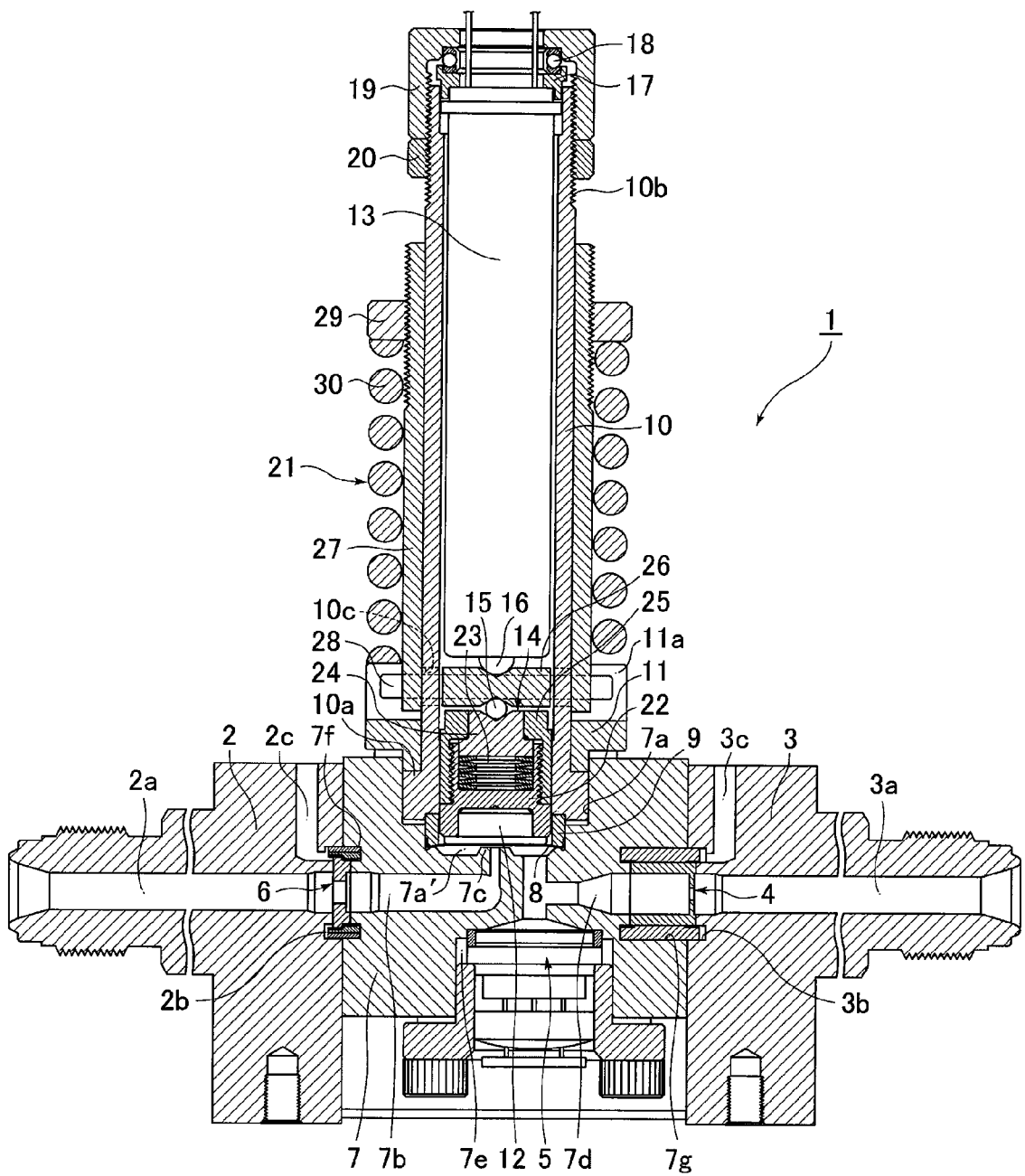
FIG. 1 is a longitudinal front view of a pressure type flow rate control apparatus that employs a normally open piezoelectric element driven metal diaphragm control valve in accordance with an embodiment of the present invention.

1 Piezoelectric element driven metal diaphragm control valve

7 Body
7a' Valve chamber
7c Valve seat
8 Metal diaphragm
10 Actuator box
10c Guide hole
12 Diaphragm presser
13 Piezoelectric element
14 Conical spring mechanism
15 Down-side ball
16 Upper-side ball
21 Preload mechanism
22 Diaphragm presser holder
22b Housing space
23 Conical spring
24 Ball rest
25 Spring adjustment nut
26 No. 1 preload jig
27 No. 2 preload jig
28 Coupling pin
29 Preload adjustment nut
30 Preload spring Best Mode for Carrying Out the Invention/Detailed Description of the Invention The preferred embodiment of the present invention is described in detail hereinafter with reference to the drawings.

FIG. 1 illustrates a normally open type piezoelectric element driven metal diaphragm control valve 1 in accordance with a preferred embodiment of the present invention, which is used as a control valve for a pressure type flow rate control apparatus. The aforementioned pressure type flow rate control apparatus is constituted to include a piezoelectric element driven metal diaphragm control valve 1, an inlet side block 2 connected to an upstream side of the piezoelectric element driven metal diaphragm control valve 1, an outlet side block 3 connected to the downstream side of the piezoelectric element driven metal diaphragm control valve 1, an orifice 4 used for flow rate control that is provided on the downstream side of the piezoelectric element driven metal diaphragm control valve 1, a pressure sensor 5 for detecting upstream side pressure of the orifice 4 wherein the pressure sensor 5 is provided on the upstream side of the orifice 4, a gasket filter 6 provided on the upstream side of the piezoelectric element driven metal diaphragm control valve 1, a control circuit (not illustrated) that operates to control the piezoelectric driven metal diaphragm control valve 1, and the like, so that the flow rate of fluid passing through an orifice connected to the pressure type flow rate control apparatus is controlled by means of opening/closing the piezoelectric element driven metal diaphragm control valve 1 while computing the flow rate of fluid passing through the orifice connected to the pressure type flow rate control apparatus by using the upstream side pressure of the orifice 4.

As shown in FIG. 1, a piezoelectric element driven metal diaphragm control valve 1 is constituted with a body 7, a metal diaphragm 8, a pressing adaptor 9, an actuator box 10, a base presser 11, a diaphragm presser 12, a piezoelectric element 13 (a piezo actuator), a conical spring mechanism 14, a down side ball 15, an up side ball 16, a bearing base 17, a bearing 18, an adjustment cap nut 19, a lock nut 20, a preload mechanism 21, and the like. By this structure, the normally open type piezoelectric element driven metal diaphragm control valve is able to achieve an accurate and stable flow rate control even under high temperature conditions in which high temperature reaction gases are used.

Specifically, as shown in FIG. 1, the body 7 is formed in the shape of a block made of stainless steel and is equipped with a recessed part 7a that forms a valve chamber 7a' having an open upper part, and an inlet passage 7b communicating with the valve chamber 7a', a ring-shaped valve seat 7c formed on the bottom face of the valve chamber 7a', an outlet passage 7d communicating with the valve chamber 7a', a sensor insertion hole 7e in which a pressure sensor 5 is inserted, a filter insertion hole 7f in which a gasket filter 6 is inserted, an orifice insertion hole 7g in which an orifice 4 is disposed, and the like.

A stainless steel made inlet side block 2 is connected to the upstream side of the body 7 by means of a plurality of bolts (not illustrated). The stainless steel inlet side block 2 is equipped with an induction passage 2a that communicates with the inlet side passage 7b of the body 7, a filter insertion hole 2b formed on the outlet side of the induction passage 2a, and a leak port 2c for testing for leakage of fluids. Also, a stainless steel made outlet side block 3 is connected to the downstream side of the body 7 by means of a plurality of bolts (not illustrated). The stainless steel outlet side block 3 is equipped with a discharge passage 3a communicating with the outlet side passage 7d of the body 7, and an orifice insertion hole 3b formed on the inlet side of a discharge passage 3a, and a leak port 3c for testing for leakage of fluids.

Figure 2:
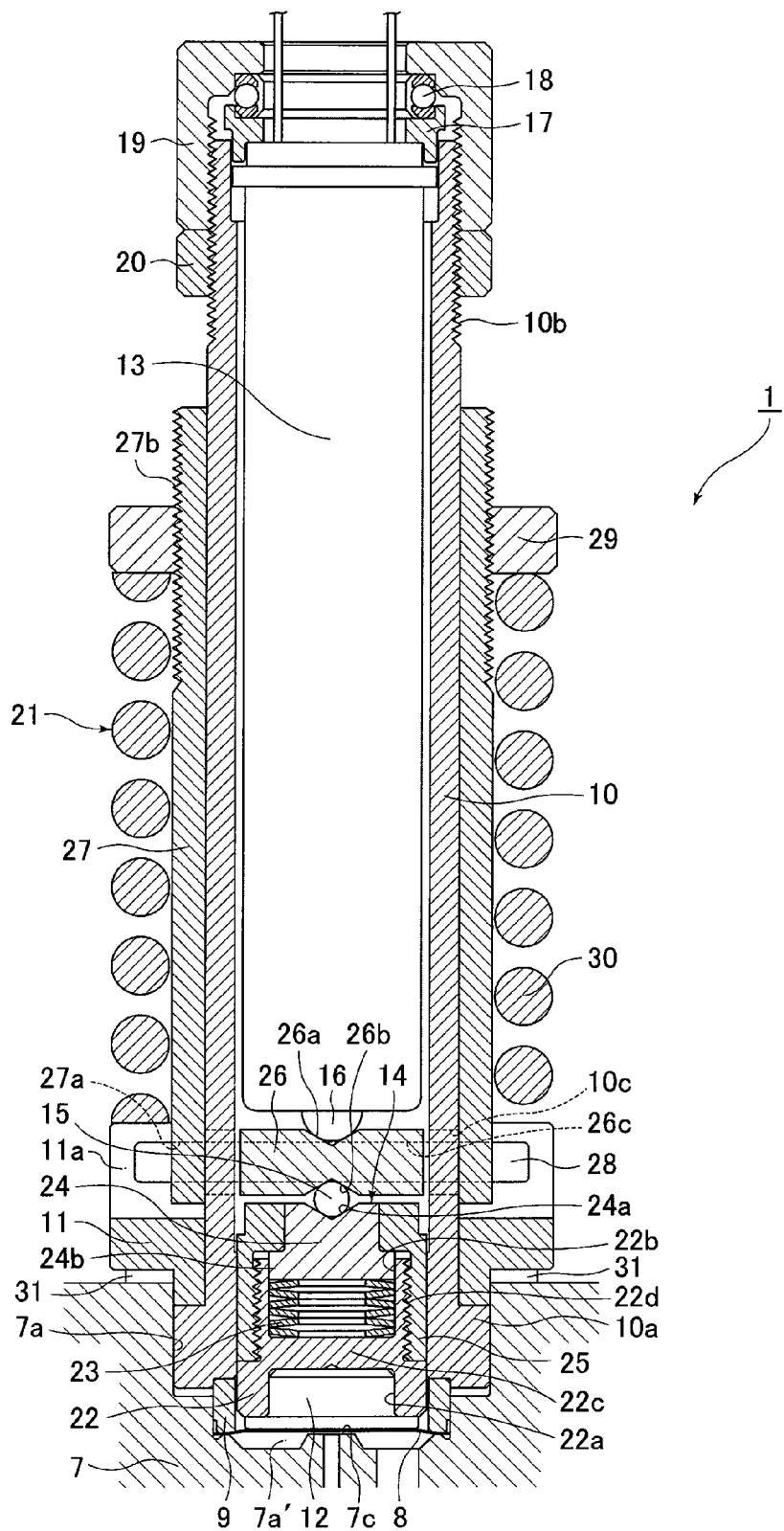
FIG. 2 is an enlarged longitudinal front view of a major part or portion of the piezoelectric element driven metal diaphragm control valve shown in FIG. 1.

As shown in FIG. 2, a metal diaphragm 8 in the shape of a very thin plate made of the Cobalt.Nickel-based highly elastic alloy (Spron 100), to which Tungsten, Molybdenum, Titanium and Chrome have been added provides the metal diaphragm with excellent durability, corrosion resistance and heat resistance, is formed in a reverse dish shape with the center part expanded upward. A cylinder-shaped pressing adaptor 9 is placed inside the recessed part 7a to make the metal diaphragm 8 face against the valve seat 7c and so that the metal diaphragm 8 is also inserted into the recessed part 7a. The lower end part of the actuator box 10 and the base presser 11 are clamped to the side of the body 7 with a plurality of bolts so that the peripheral part or portion of the metal diaphragm 8 is hermetically maintained and fixed to the side of the body 7 by the pressing adaptor 9, and the like.

It goes without saying that stainless steel, Inconel, and other alloyed steels can be used as the material for making the metal diaphragm 8. Also, it is possible in accordance with the present invention that a plurality of metal diaphragms can be laminated together to make the metal diaphragm 8.

As shown in FIG. 2, the actuator box 10 is formed in a cylinder shape and is made using Invar® (a 36 percent nickel-iron alloy), which has a small thermal expansion rate. A step part 10a thrust downward by the base presser 11 is formed on the outer peripheral face of a lower end part or portion of the actuator box 10. On this outer peripheral face of the upper end part or portion of the actuator box 10, there is formed a male screw 10b that is screwed to an adjustment cap nut 19 and to a lock nut 20 so as to be capable of vertically free movement along the actuator box 10 for the purpose of adjustment. On the surrounding wall of the lower end part or portion of the actuator box 10 a longitudinal guide hole 10c is formed in a through-state into which two coupling pins 28, which are components of the preload mechanism 21, are inserted in a state wherein they are freely engaged.

As shown in FIG. 1, a piezoelectric element 13 (a piezo actuator) is provided inside the actuator box 10 to thrust the metal diaphragm 8. The piezoelectric element 13 has an upper end part or portion that is supported by the adjustment cap nut 19, which is screwed to the upper end part or portion of the actuator box 10, through mediation of the bearing base 17 and the bearing 18. With this structure, the center part of the metal diaphragm 8 may be thrust toward the side of the valve seat 7c through mediation of the upper side ball 16, the No. 1 preload jig 26 of the preload mechanism 21, the lower side ball 15, the conical spring mechanism 14, and the diaphragm presser 12 so that the piezoelectric element 13 is elongated downward when voltage is applied to the piezoelectric element.

For the piezoelectric element 13, there is employed one of a laminated type, which has an operating temperature limit of −20° C.~150° C.

A conical spring mechanism 14 is provided between the diaphragm presser 12 provided on the upper face side of the metal diaphragm 8 and the No. 1 preload jig 26 of the preload mechanism 21 that is positioned directly under the piezoelectric element 13. Elongation of the piezoelectric element 13 when voltage is applied is absorbed, and a prescribed thrust is applied to the seat part (comprising the valve seat 7c and the corresponding portion of the metal diaphragm 8 that contacts the valve seat part 7c) of the control valve 1 when the metal diaphragm 8 makes contact with the valve seat 7c due to elongation of the piezoelectric element 13.

In particular, as shown in FIG. 2, the conical spring mechanism 14 is equipped with a housing space 22b and has a downward insertion hole 22a in which the diaphragm presser 12 is inserted on the lower end part or portion, and the conical spring mechanism 14 also has an open upper end, and an intermediate part or portion that comprises a cylinder-shaped diaphragm presser holder 22, which forms a wall 22c. The conical spring mechanism 14 also includes a plurality of conical springs 23 accommodated in the housing space 22b of the diaphragm presser holder 22 and are supported by the wall 22c, and a ball rest 24 is placed on the upper face of the uppermost conical spring 23. The ball rest 24 has a cone-shaped ball rest groove 24a supporting an upper side ball 16 that is placed on the center part of the upper face of the ball rest 24 and the ball rest 24 is also equipped with a brim part 24b on the outer peripheral face of the lower end part or portion of the ball rest. A spring adjustment nut 25 is screwed to male nut 22d formed on the outer peripheral face of the upper end part or portion of the diaphragm presser holder 22 so the spring adjustment nut 25 and the male nut 22d are capable of relative vertically free movements with respect to one another, and the brim part 24b of a ball rest 24 is engaged with the spring adjustment nut 25, thus preventing the ball rest 24 and the conical springs 23 from coming off from, or falling out of, the housing space 22b of the diaphragm presser holder 22. By this structure, it is possible that the repulsion force provided by the conical springs 23 is freely controlled in a manner so that by adjusting the clamping degree of a spring adjustment nut 25 (i.e., the vertical position of the spring adjustment nut 25 on the male nut 22d) the repulsion force exerted by the conical springs 23 is adjusted.

The diaphragm presser holder 22, the ball rest 24 and the spring adjustment nut 25 are made of Invar® having a small thermal expansion rate. Also, the diaphragm presser 12 is formed with Polyimide or Invar® having a small thermal expansion rate. The preload mechanism 21 is provided between the lower end part or portion of the piezoelectric element 13 and the conical spring mechanism 14 and the preload mechanism is disposed around the actuator box 10. The preload mechanism 21 is constituted so that an upward compressive force is applied by the preload mechanism at all times to the piezoelectric element 13 and so that the compressive force applied to the piezoelectric element 13 can be adjusted externally without having to disassemble the control valve 1.

Figure 3:
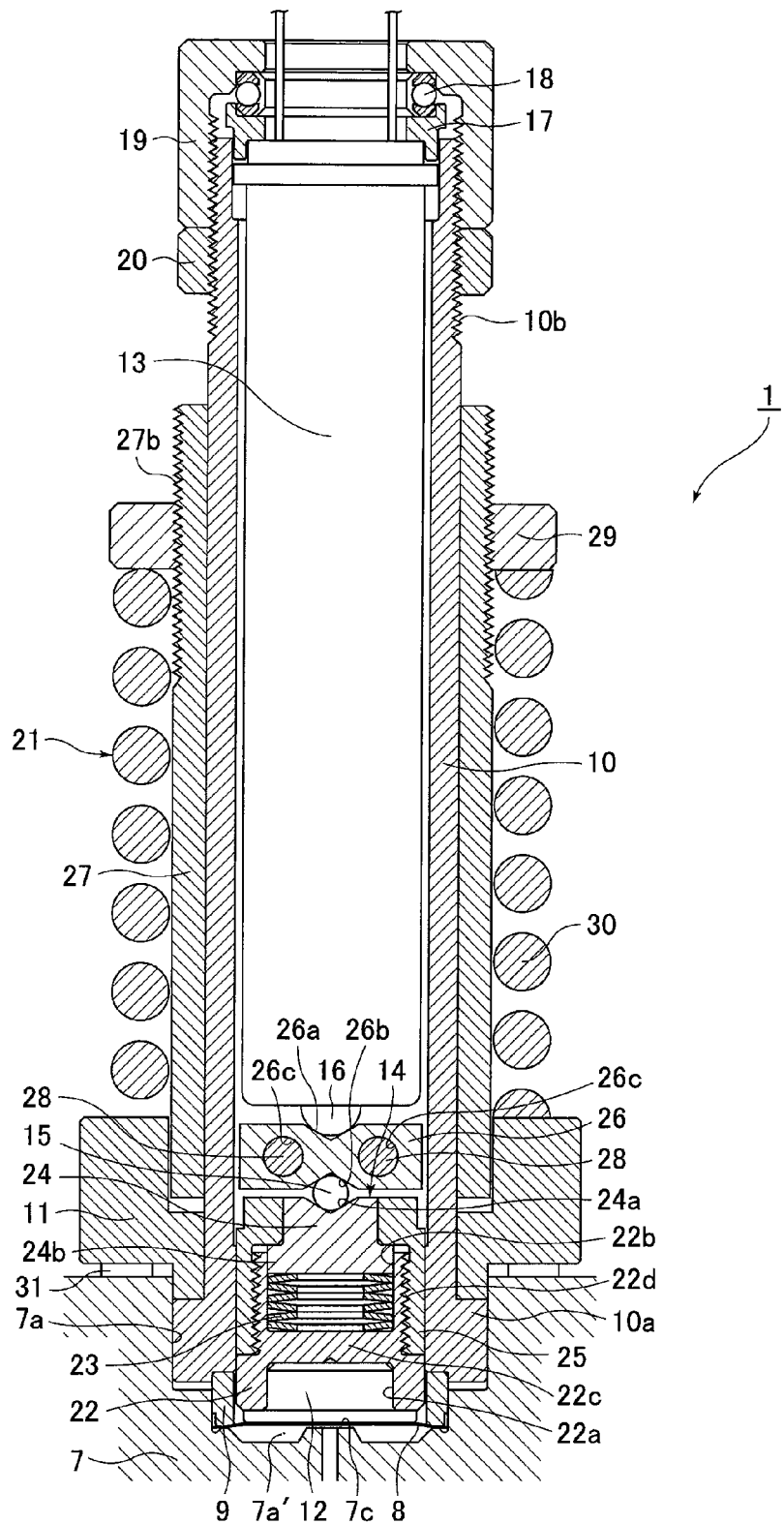
FIG. 3 is an enlarged longitudinal side view of a major part or portion of a piezoelectric element driven metal diaphragm control valve.
Figure 4:
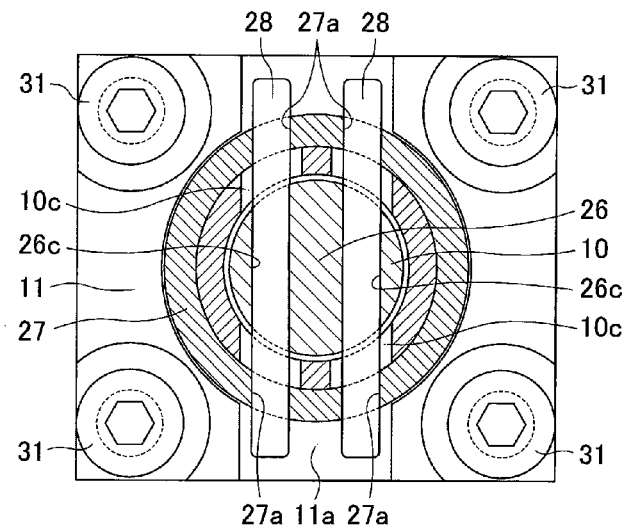
FIG. 4 is a transverse front view of a major part or portion of a piezoelectric element driven metal diaphragm control valve.

In particular, as shown in FIG. 2 to FIG. 4, the preload mechanism 21 comprises a disc-shaped No. 1 preload jig 26 provided directly under the piezoelectric element 13 and the No. 1 preload jig makes contact with the lower end face of the piezoelectric element 13 through mediation of the upper side ball 16 that is disposed between the No. 1 preload jig and the piezoelectric element 13. The preload mechanism also includes a cylinder-shaped No. 2 preload jig 27 engaged so as to be capable of free vertical movements with respect to the outer peripheral face of the actuator box 10, and coupling pins 28 are inserted in parallel into the No. 1 preload jig 26 and the No. 2 preload jig 27 in a through-state (i.e., so as to be inserted through both the No. 1 preload jig and the No. 2 preload jig) in order to connect the No. 1 preload jig 26 and the No. 2 preload jig 27. The coupling pins 28 move vertically along the longitudinal guide hole 10c formed on the actuator box 10. A preload adjustment nut 29 is screwed to the outer peripheral face of the upper end part or portion of the No. 2 preload jig 27 so as to be capable of free vertical movement with respect to the No. 2 preload jig 27. A preload spring 30 is provided around the actuator box 10 in a state wherein the upper end part or portion of the spring 30 is in contact with the preload adjustment nut 29 so as to exert pressure on the piezoelectric element 13 all the times by pushing up the No. 1 preload jig 26, the coupling pins 28, the No. 2 preload jig 27 and the preload adjustment nut 29, and thereby allows the compressive force applied to the piezoelectric element to be adjusted freely by means of changing the clamping degree or position of the preload adjustment nut 29.

Specifically, the No. 1 preload jig 26 is formed in a disc-shape using stainless steel, or Inver®, which have a small thermal expansion rate, and is structured so that it is capable of free vertical movements between the lower end part or portion of the piezoelectric element 13 and the conical spring mechanism 14. On a center part or portion of the upper face of the No. 1 preload jig 26 there is formed a cone-shaped ball rest groove 26a, which is disposed on the lower end face of the piezoelectric element 13 on which the upper side ball 16 is placed, and on a center part or portion of the lower face of the No. 1 preload jig 26 there is formed a reverse cone-shaped ball rest groove 26b in which the lower side ball 15 is inserted, and the lower side ball 15 is placed on and supported by the ball rest 24. Also, on the No. 1 preload jig 26, there are formed two insertion holes 26c in which two coupling pins 28 are fitted horizontally and in parallel, and symmetrically, with an axis of the No. 1 preload jig 28. The two insertion holes are formed in an opposite direction to a longitudinal guide hole 10c of the actuator box 10.

The No. 2 preload jig 27 is formed in a cylinder-shape using stainless steel, or Invar® which has a small thermal expansion rate, and is engaged with the outer peripheral face of the actuator box 10 so that it is capable of free vertical sliding movements relative to the actuator box 10. On the lower end part or portion of the No. 2 preload jig 27 there are formed insertion holes 27a in which both end parts or portions of the two coupling pins 28 are inserted in parallel. Thus, the two coupling pins 28 are inserted into the insertion holes 27a of the No. 2 preload jug 27 and into the insertion holes 26c of the No. 1 preload jig 26, respectively, and on the outer peripheral face of the No. 2 preload jig 27 there is formed a male nut or thread 27b to which a preload adjustment nut 29 is screwed.

The two coupling pins 28 are formed in the linear shape of an axis using stainless steel, or Invar® that has a small thermal expansion rate, and are inserted into and through the No. 1 preload jig 26 and the No. 2 preload jig 27 so that the No. 1 preload jig 26 and the No. 2 preload jig 27 are connected. After assembly in this manner, both coupling pins 28 are disposed so that they are able to move upward and downward along the guide hole 10c of the actuator box 10 because the coupling pins 28 have been inserted into the longitudinal guide hole 10c of the actuator box 10 in a state wherein they are moveably engaged, and the coupling pins 28 are also being accommodated in a recessed part 11a formed on the upper face of base presser 11.

The preload adjustment nut 29 is made of stainless steel or Invar® that has a small thermal expansion rate, and the preload adjustment nut 29 is screwed to the male nut 27b formed on the upper end part or portion of the outer peripheral face of the No. 2 preload jig 27 so that the preload adjustment nut 29 is capable of free vertical movements relative to the No. 2 preload jig 27.

The preload spring 30 is disposed around the actuator box 10 in a state wherein its upper end part or portion makes contact with the lower face of the preload adjustment nut 29 and its lower end part or portion makes contact with the upper face of the base presser 11, respectively. The repulsion force of the preload spring 30 pushes up the No. 1 preload jig 26 and the coupling pins 28, the No. 2 preload jig 27 and the preload adjustment nut 29 so that the piezoelectric element 13 experiences a pressure all the time from the preload spring 30. The preload spring 30, which is a compression spring, is able to be adjusted as desired with respect to the compressive strength it applies to the piezoelectric element 13 by means of adjusting the clamping degree of the preload adjustment nut 29 (i.e, by moving the preload adjustment nut 29 upwards or downwards along the male nut 27b by screwing).

The aforementioned piezoelectric element driven metal diaphragm control valve 1 is made so that the working stroke of the metal diaphragm 8 with piezoelectric element 13 is adjusted to be at a set value by adjusting the clamping degree of the preload adjustment nut 29. In accordance with an example of the present invention, the clamping degree of the preload adjustment nut 29 is set (i.e., by adjusting the position of the preload adjustment nut 29 on male nut or thread 27b of preload jig No. 1) so that a compressive strength or force of approximately 200N is applied to the piezoelectric element 13 at all times. Furthermore, after the piezoelectric element driven metal diaphragm control valve 1 is assembled, the axes of the diaphragm presser 12, members of the conical spring mechanism 14, the under side ball 15, the No. 1 preload jig 26, the up side ball 16, the piezoelectric element 13, and the like, are all accurately in alignment.

Thus, in accordance with the aforementioned piezoelectric element driven metal diaphragm control valve 1, the piezoelectric element 13 is elongated by a set value in accordance with the voltage applied when the driving voltage is applied to the piezoelectric element 13 through mediation of a connector from a control circuit (not illustrated). And, because the compressive force that presses the piezoelectric element 13 upward at all times is applied to the piezoelectric element 13 using the preload mechanism 21, for example, then even when the actuator box 10, in which the piezoelectric element 13 is accommodated, is elongated due to thermal expansion, a certain set compressive force can be applied to the piezoelectric element 13 at all times due to the preload mechanism 21 without having to provide a clearance space between the upper end part or portion of the piezoelectric element 13 and the adjustment cap nut 19. As a result, it is possible for the piezoelectric element driven metal diaphragm control valve 1 of the present invention to transmit the generating force to the metal diaphragm 8 surely and smoothly at the time when the piezoelectric element 13 is elongated (i.e., is in an elongated state).

Figure 5:
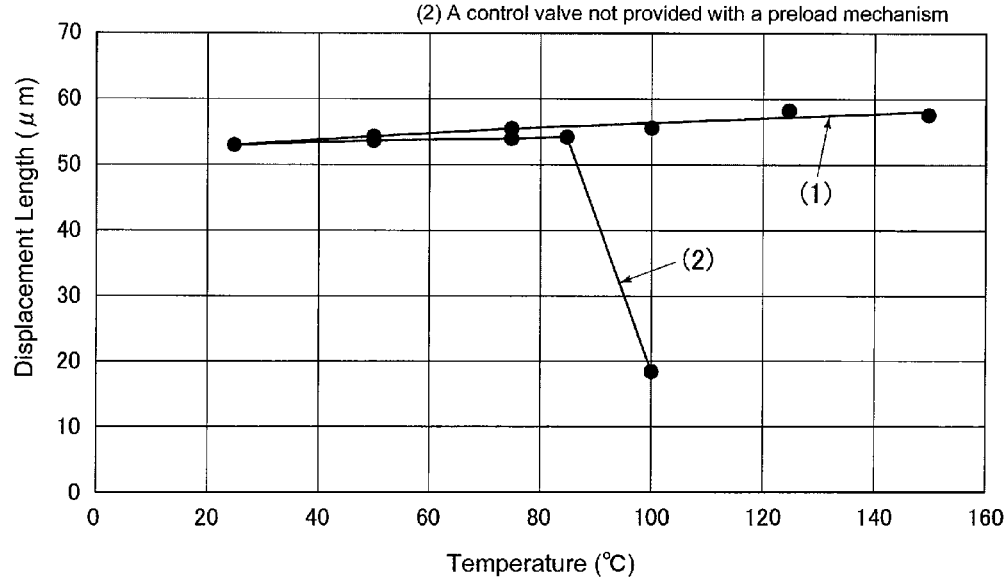
FIG. 5 is a graph showing the relationship between the operating temperature and the displacement length of a piezoelectric element driven metal diaphragm control valve provided with a preload mechanism in accordance with the present invention, and an ordinal piezoelectric element driven metal diaphragm control valve that is not equipped with a preload mechanism.
Figure 6:
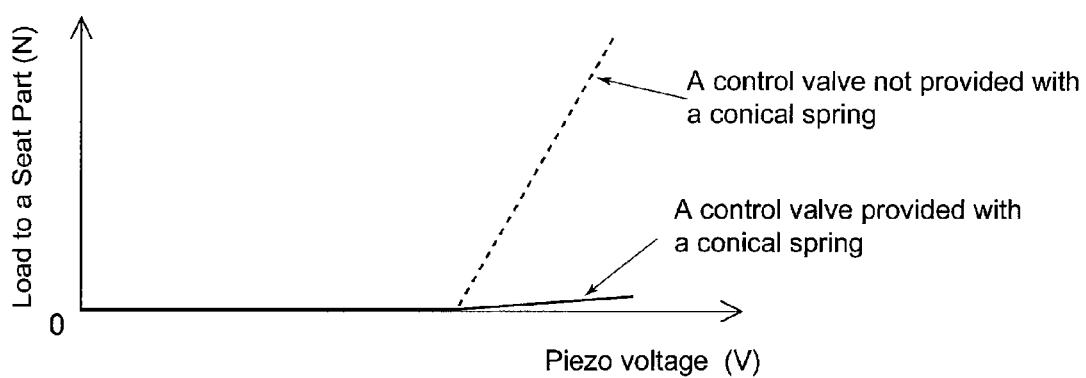
FIG. 6 is a graph showing the relationship between the load applied to the seat part of a control valve and the voltage applied to a piezoelectric element.

FIG. 5 is a graph showing the relationship between the operating temperature and the displacement length of a piezoelectric element driven metal diaphragm control valve 1 equipped with a preload mechanism in accordance with the present invention and an ordinary piezoelectric element driven metal diaphragm control valve that is not equipped with a preload mechanism. As apparent from FIG. 5, compared with a piezoelectric element driven metal diaphragm control valve 1 that is not equipped with a preload mechanism, the piezoelectric element driven metal diaphragm control valve 1 equipped with the preload mechanism 21, in accordance with the present invention, can transmit the generating force of the piezoelectric element 13 in a sure manner to the metal diaphragm 8.

When the piezoelectric element 13 is elongated due to voltage applied to the piezoelectric element 13, the diaphragm presser 12 is pushed down by the generating force of the piezoelectric element 13 through mediation of the up side ball 16, the No. 1 preload jig 26, the under side ball 15 and the conical spring mechanism 14; thus, the metal diaphragm 8 is pushed down to the side of the valve seat 7c so that the metal diaphragm 8 makes contact with the valve seat 7c. In this position, the metal diaphragm 8 is making contact with valve seat 7c so the control valve 1 is in the state of being closed.

After the metal diaphragm 8 has made contact with the valve seat 7c, the conical spring mechanism 14 provided between the lower end part or portion of the piezoelectric element 13 and the diaphragm presser 12 absorbs elongation of the piezoelectric element 13, and the repulsion force in accordance with the displacement length of the conical spring 23 is applied to the seat part (i.e., the seat part comprises the valve seat 7c and a part or portion of the metal diaphragm 8 making contact with the valve seat). As a result, the piezoelectric element driven metal diaphragm control valve 1, the metal diaphragm 8 and the valve seat 7c are protected from being damaged because the large generating force provided by the piezoelectric element 13 is not applied directly to the seat part.

On the other hand, when the driving voltage applied to the piezoelectric element 13 is released (i.e., is no longer applied), the piezoelectric element 13 returns to its original length from the elongated length state occurring while voltage was applied, and the corresponding thrust force applied to the metal diaphragm 8 by the piezoelectric element disappears. Consequently, the metal diaphragm 8 returns to its original state due to the elasticity of the metal diaphragm 8. Consequently, the metal diaphragm 8 departs from the valve seat 7c so that the metal diaphragm 8 and the valve seat 7c are not in contact with one another. In this position, with the metal diaphragm 8 not making contact with the valve seat 7c, the control valve 1 is in the state of being opened.

At this time, due to the fact that the compressive force pressing the piezoelectric element 13 upward is applied to the piezoelectric element 13 at all times by the preload mechanism 21, the weight of the piezoelectric element 13 is therefore not applied to the metal diaphragm 8. Consequently, the weight applied to the metal diaphragm 8 becomes equal to the weight of a diaphragm presser 12 and a conical spring mechanism 14, and does not include the weight of the piezoelectric element 13. As a result, it is possible for the piezoelectric element driven metal diaphragm control valve 1 to reduce the weight applied to the metal diaphragm 8 at the time when the metal diaphragm 8 departs from the valve seat 7c, due to the elasticity of the metal diaphragm 8, thus preventing the metal diaphragm 8 from deterioration and improving the life of the metal diaphragm.

The aforementioned piezoelectric element driven metal diaphragm control valve 1 is provided with the preload spring 30 of the preload mechanism 21 in order to pressurize the piezoelectric element 13 all the times, wherein the preload spring 30 is provided around the actuator box 10 and the compressive force applied to the piezoelectric element 13 can be adjusted by means of the preload adjustment nut 29 screwed to the No. 2 preload jig 27. The preload adjustment nut 29 and the No. 2 preload jig 27 are positioned outside the actuator box 10 so that it is not required to be upsized even when the preload spring 30 has a large elasticity. Furthermore, the compressive force applied to the piezoelectric element 13 from the preload spring 30 can be freely adjusted without having to disassemble the control valve.

The piezoelectric element driven metal diaphragm control valve 1 is provided with the No. 2 preload jig 27 of the preload mechanism 21, the preload adjustment nut 29 and the preload spring 30, which are disposed around the actuator box 10 in a manner that allows assembly of the control valve to be done relatively simply and easily.

Furthermore, the piezoelectric element driven metal diaphragm control valve 1 is constituted so that the conical spring mechanism 14 comprises the diaphragm presser holder 22 which forms the housing space having an open upper part, a plurality of conical springs 23 placed in the housing space of the diaphragm presser holder 22, the ball rest 24 placed on the upper face of the uppermost conical spring 23, and the spring adjustment nut 25 screwed to the diaphragm presser holder 22 so that it is capable of free vertical movements relative to the diaphragm presser holder 22 in order to adjust the repulsion force of the conical spring 23 and in order to prevent the ball rest 24 and the conical spring from coming off or falling out of position. The conical spring mechanism 14 is constructed so that the repulsion force generated by the conical springs 23 can be adjusted by adjusting the clamping degree of the spring adjustment nut 25 so that the repulsion force generated by the conical spring 23 can be adjusted freely without having to replace the conical spring 23 with another one.

Feasibility of Industrial Use

A piezoelectric element driven metal diaphragm control valve 1 in accordance with the present invention is mainly used for a gas control line, but not only with respect to semiconductor manufacturing facilities but also for gas control lines with respect to manufacturing facilities used in the chemical industry, pharmaceutical industry, or food processing industry.

What is claimed is:

1. A normally open type piezoelectric element driven metal diaphragm control valve comprising:
   (a) a body provided with a valve seat disposed on a bottom face of a valve chamber (7a') formed in the body, wherein the valve chamber has an open upper end;
   (b) a metal diaphragm installed in an opposite direction to the valve seat so that an outer periphery of the metal diaphragm is hermitically sealed and so that the metal diaphragm makes contact with the valve seat (7c) by thrusting downward when thrust is present, and the metal diaphragm departs from contact with the valve seat due to an elastic force of the metal diaphragm when thrust is not present;
   (c) a diaphragm presser installed on an upper face side of the metal diaphragm (8);
   (d) an actuator box installed above the valve chamber so that a lower end portion of the actuator box is fixed to a side of the body;
   (e) a piezoelectric element installed inside the actuator box and disposed so as to provide thrust for thrusting the metal diaphragm by thrusting the diaphragm presser, wherein the piezoelectric element provides thrust by elongating downward when voltage is applied to the piezoelectric element;
   (f) a conical spring mechanism disposed between the diaphragm presser and the piezoelectric element so that the conical spring mechanism absorbs a first portion of the thrust provided by elongation of the piezoelectric element when voltage is applied to the piezoelectric element and the metal diaphragm makes contact with the valve seat so that a prescribed second portion of the thrust is applied to a seat part comprising the valve seat and a portion of the metal diaphragm that makes contact with the valve seat; and
   (g) a preload mechanism installed between the piezoelectric element and the conical spring mechanism and around the actuator box, wherein the preload mechanism constantly applies an upward compressive force to the piezoelectric element, wherein the compressive force applied to the piezoelectric element by the preload mechanism is externally adjustable.

2. A normally open type piezoelectric element driven metal diaphragm control valve as claimed in claim 1, wherein the preload mechanism comprises
   i. a disc-shaped first preload jig installed directly under the piezoelectric element so as to make contact with a lower end face of the piezoelectric element via a ball;
   ii. a cylinder-shaped second preload jig fitted to an outer peripheral face of the actuator box so as to move with free vertical movement relative to the second preload jig;
   iii. a coupling pin inserted in the first preload jig and in the second preload jig in a through state so as to connect the first preload jig with the second preload jig, wherein the coupling pin travels with free vertical movement along a longitudinal guide hole formed in the actuator box;
   iv. a preload adjustment nut screwed to the second preload jig so as to move with free vertical movement along an outer peripheral face of an upper end portion of the second preload jig; and
   v. a preload spring installed around the actuator box so that an upper end portion of the preload spring makes contact with the preload adjustment nut so that the preload spring constantly exerts pressure on the piezoelectric element by pushing upwards the first preload jig, the coupling pin, the second preload jig and the preload adjustment nut.

3. A normally open type piezoelectric element driven metal diaphragm control valve as claimed in claim 1, wherein the conical spring mechanism comprises
   i. a diaphragm presser holder having a lower end portion fitted with the diaphragm presser and the diaphragm presser holder is provided with a housing space having with an open end top formed on an upper end portion of the diaphragm presser holder;
   ii. a plurality of conical springs placed in the housing space of the diaphragm presser holder;
   iii. a ball rest for the ball, wherein the ball rest is placed on an upper face of the uppermost conical spring of the plurality of conical springs so that the ball makes contact with the first preload jig of the preload mechanism and the ball makes contact with the ball rest at a center portion of an upper face of the ball rest; and
   iv. a spring adjustment nut is screwed to an outer peripheral face of an upper end portion of the diaphragm presser holder so as to move with free vertical movement in order to adjust repulsion force of the uppermost conical spring and so as to prevent the ball rest and the plurality of conical springs from coming out of position, wherein the repulsion force of the conical spring is adjusted by adjusting a clamping degree of the spring adjustment nut by moving the spring adjustment nut vertically along the outer peripheral fact of the upper end of the diaphragm presser holder.

4. A normally open type piezoelectric element driven metal diaphragm control valve as claimed in claim 2, wherein the conical spring mechanism comprises
   i. a diaphragm presser holder having a lower end portion fitted with the diaphragm presser and the diaphragm presser holder is provided with a housing space having an open end top formed on an upper end portion of the diaphragm presser holder;
   ii. a plurality of conical springs placed in the housing space of the diaphragm presser holder;
   iii. a ball rest for the ball, wherein the ball rest is placed on an upper face of the uppermost conical spring of the plurality of conical springs so that the ball makes contact with the first preload jig of the preload mechanism and the ball makes contact with the ball rest at a center portion of an upper face of the ball rest; and
   iv. a spring adjustment nut is screwed to an outer peripheral face of an upper end portion of the diaphragm presser holder so as to move with free vertical movement in order to adjust repulsion force of the uppermost conical spring and so as to prevent the ball rest and the plurality of conical springs from coming out of position, wherein the repulsion force of the conical spring is adjusted by adjusting a clamping degree of the spring adjustment nut by moving the spring adjustment nut vertically along the outer peripheral fact of the upper end of the diaphragm presser holder.

5. A normally open type piezoelectric element driven metal diaphragm control valve as claimed in claim 1, wherein the preload mechanism is externally adjustable by moving a preload adjustment vertically along an outer peripheral face of the preload mechanism.

* * * * *